(12) United States Patent
Kobrin (10) Patent No.: US 6,547,975 B1
(45) Date of Patent: Apr. 15, 2003

(54) MAGNETIC POLE FABRICATION PROCESS AND DEVICE

(75) Inventor: Boris Kobrin, San Francisco, CA (US)

(73) Assignee: Unaxis USA Inc., St. Petersburg, FL (US)

( * ) Notice: Subject to any disclaimer, the term of this patent is extended or adjusted under 35 U.S.C. 154(b) by 244 days.

(21) Appl. No.: 09/696,739

(22) Filed: Oct. 26, 2000

Related U.S. Application Data (60) Provisional application No. 60/162,197, filed on Oct. 29, 1999.

(51) Int. Cl.$^7$ .................................................. G11B 5/31
(52) U.S. Cl. ........................ 216/22; 204/192.1; 427/251
(58) Field of Search ...................... 204/192.1; 216/22, 216/37, 41; 427/128, 251

(56) References Cited

U.S. PATENT DOCUMENTS

| | | | |
|---|---|---|---|
| 4,209,349 A | 6/1980 | Ho et al. | |
| 4,358,340 A | 11/1982 | Fu | |
| 4,377,437 A | 3/1983 | Taylor et al. | |
| 4,377,734 A | 3/1983 | Mashiko et al. | |
| 4,389,482 A | 6/1983 | Bargon et al. | |
| 4,419,809 A | 12/1983 | Riseman et al. | |
| 4,445,267 A | 5/1984 | De La Moneda et al. | |
| 4,502,914 A | 3/1985 | Trumpp et al. | |
| 4,504,574 A | 3/1985 | Meyer et al. | |
| 4,552,833 A | 11/1985 | Ito et al. | |
| 4,601,778 A | 7/1986 | Robb | |
| 4,613,398 A | 9/1986 | Chiong et al. | |
| 4,657,845 A | 4/1987 | Frechet et al. | |
| 4,690,729 A | 9/1987 | Douglas | 156/643 |
| 4,751,170 A | 6/1988 | Mimura et al. | |
| 4,803,181 A | 2/1989 | Buchmann et al. | |
| 4,886,565 A | 12/1989 | Koshiba et al. | |
| 5,599,745 A | 2/1997 | Reinberg | 437/195 |
| 5,665,251 A | 9/1997 | Robertson et al. | |
| 5,774,308 A * | 6/1998 | Ohtsuka et al. | 360/126 |
| 5,788,447 A | 8/1998 | Yonemitsu et al. | |
| 5,792,593 A | 8/1998 | McClure et al. | 430/314 |
| 5,825,609 A | 10/1998 | Andricacos et al. | 361/321.4 |
| 5,851,733 A | 12/1998 | Sezi et al. | |
| 5,858,621 A | 1/1999 | Yu et al. | |
| 5,863,705 A | 1/1999 | Sezi et al. | |
| 5,895,273 A | 4/1999 | Burns et al. | 438/719 |
| 6,100,014 A | 8/2000 | Lin et al. | |
| 6,110,637 A | 8/2000 | Sezi et al. | |

FOREIGN PATENT DOCUMENTS

JP    4-14049    1/1992

OTHER PUBLICATIONS

Wolf–Dieter Domle, "Chemical amplification of resist lines: The CARL process", Microlithography World, Spring 1999, pp. 2–5.

"Nanometer Sidewall Lithography By Resist Silylation", P. Vettiger, et al., J. Vac. Sci. Technol., Nov./Dec. 1989, vol. 7, No. 6, pps. 1756–1759.

* cited by examiner

*Primary Examiner*—Allan Olsen
(74) *Attorney, Agent, or Firm*—Foley & Lardner (57) ABSTRACT

A method and apparatus for fabricating a submicrometer structure. The method incorporates a sputtering process to deposit an electromagnetic material from a seedlayer onto a vertical sidewall. The vertical sidewall is subsequently removed, leaving a free-standing pole-tip. The resulting structure formed can have a a width of less than 0.3 micrometers, if desired. This structure can be used as a magnetic pole of a thin film head ("TFH") for a data storage device.

14 Claims, 11 Drawing Sheets

MAGNETIC POLE FABRICATION PROCESS AND DEVICE

This application claims priority of U.S. Provisional Application No. 60/162,197 filed on Oct. 29, 1999, the entirety of which is hereby incorporated by reference.

BACKGROUND OF THE INVENTION

Field of the Invention

The present invention is directed to a method and apparatus for forming submicrometer structures on a substrate. In one embodiment, these structures can be magnetic poles of thin film heads for data storage devices.

Many electronic products require the construction of miniature metallic structures. An example of such a structure is the second pole tip of a thin film recording head. Conventional processes for the fabrication of magnetic recording heads often comprise a combination of lithographic, deposition, plating, and etching processes. Typical recording heads are formed on $Al_2O_3$/TiC ceramic wafers that are eventually formed into sliders that fly over magnetic disks to perform read and write functions.

In a thin film recording head, it is desirable that the width of the pole tip of a second pole piece is made as narrow as possible in order to increase track density, which represents the number of tracks per inch width of the recording medium on which the head writes. The higher the track density, a greater number of bits per a greater area can be stored on the magnetic medium. The effort to produce narrower track-widths is a constant challenge to the field.

One conventional method of creating pole structures is to fabricate a mask or "resist frame for plating" in conjunction with an electroplating process. For example, a conventional image transfer process to create an anisotropic cavity or trench in a semiconductor device, with the cavity having a seedlayer as the floor, is discussed in U.S. Pat. No. 5,665,251 (the '251 patent) and is shown in FIG. 1.

Figure 1:
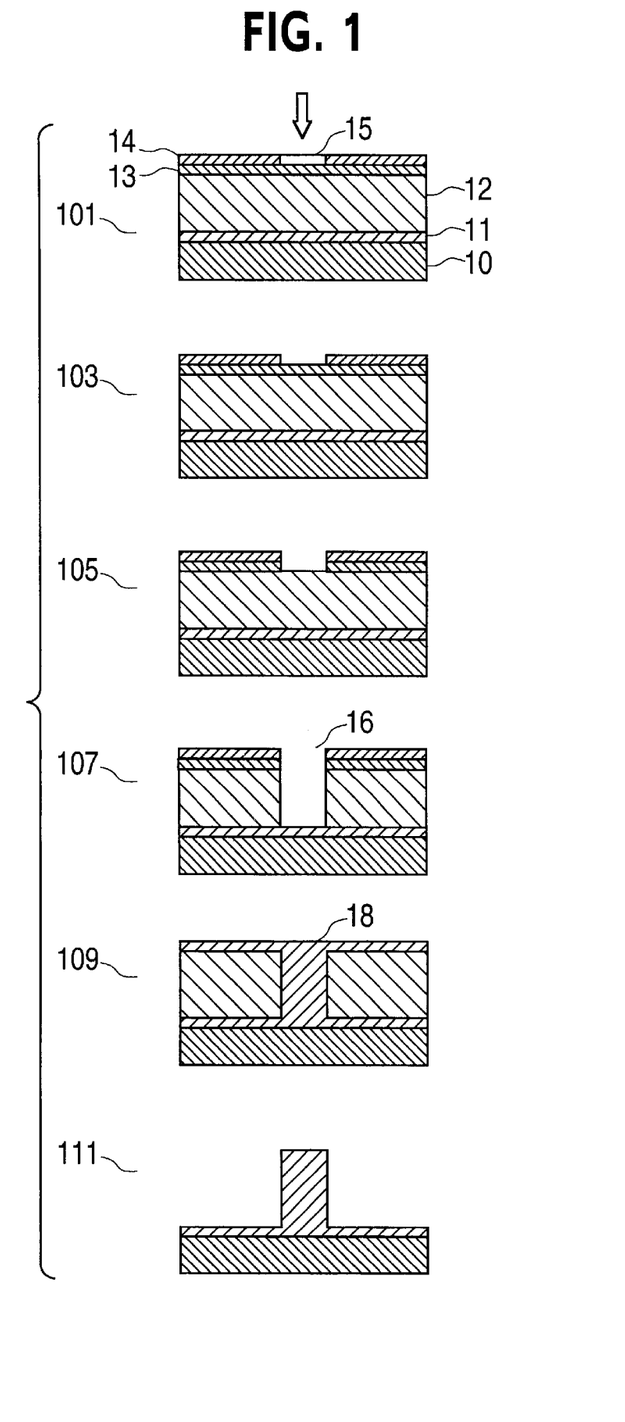
FIG. 1 is a schematic diagram of a conventional fabrication process.

In FIG. 1, a seedlayer 11 is formed over a substrate 10. A thick photoresist layer 12 is formed over seedlayer 11. A masking layer 13 is formed on top of the thick photoresist layer 12, then a thin photoresist layer 14 is formed on masking layer 13.

The magnetic pole structure then can be created on the seedlayer 11 in the cavity 16, with the seedlayer providing an electrical path to the structure. A portion 15 of thin resist layer 14 is first removed in steps 101 (exposure to light) and 103 (wet development with an aqueous solution). In step 105, mask layer 13 is etched by a reactive ion etching ("RIE") process. To create the cavity, thick layer 12, typically of polymeric photoresist, is etched (in step 107) using a RIE process. RIE is used to etch the thick layer because RIE can produce highly anisotropic cavities. However, RIE can also damage the underlying seedlayer. To prevent this damage during photoresist etching, a deposition of a protective layer, such as alumina or silicon dioxide, (not shown), can be formed on top of the seedlayer 11. After the creation of the cavity, the protective layer in the bottom of the cavity is removed in a subsequent step which does not damage the seedlayer nor undercut the thick layer. An electro-deposition process (step 109) is used to form a pole structure 18. The remaining thick photoresist layer 12 is then removed by further RIE etching.

It is desirable, however, to improve upon conventional processes, such as the process described above, in order to fabricate narrower pole structures for greater track densities on recording media. Such narrower pole structures preferably would have widths less than about 0.3 micrometers ($\mu$m).

SUMMARY OF THE INVENTION

In view of the foregoing, it would be desirable to provide a process for the fabrication of sub-micrometer structures on a substrate. According to one embodiment of the present invention, a method for forming a submicrometer structure is provided. A submicrometer structure is formed from a multi-layer mask structure that includes a substrate, a seedlayer deposited on the substrate, a first polymer layer deposited on the seedlayer, a mask layer deposited on the first polymer layer, and a second polymer layer deposited on the mask layer, where the first polymer layer is thicker than the second polymer layer. A first etch of the first polymer layer is performed to define a vertical sidewall portion of the first polymer layer. Next, atoms from the seedlayer are sputtered onto the vertical sidewall portion of the first polymer layer to form the submicrometer structure. From this method, structures, such as magnetic pole pieces, can be formed having widths of less than 0.3 micrometers, if desired.

According to another embodiment of the present invention, a method for forming a submicrometer structure is provided. A submicrometer structure is formed from a multi-layer mask structure that includes a substrate, a seedlayer deposited on the substrate, and a polymer layer deposited on the seedlayer. The polymer layer is lithographically patterned with an exposure to define a vertical sidewall portion of the polymer layer. Next, atoms from the seedlayer are sputtered onto the vertical sidewall portion of the polymer layer to form the submicrometer structure.

Further features and advantages of the invention, as well as the structure and operation of various embodiments of the invention, are described in detail below with reference to the accompanying drawings.

BRIEF DESCRIPTION OF THE DRAWINGS

The accompanying drawings, which are incorporated herein and form part of the specification, illustrate, but do not limit, the present invention and, together with the description, further serve to explain the principles of the invention and to enable a person skilled in the pertinent art to make and use the invention.

DETAILED DESCRIPTION OF THE INVENTION

The present invention pertains to methods and apparatuses for the fabrication of sub-micrometer structures on substrates. For example, the process of the present invention can be used to build a free-standing, miniature magnetic pole tip structure having a width of less than 0.3 μm, if desired.

The method of the present invention incorporates a sputtering process to deposit an magnetic material onto a polymer vertical sidewall. The polymer vertical sidewall is subsequently removed, leaving a free-standing pole-tip structure. The thickness of the resulting structure can be controlled by the sputtering process. The resulting structure formed by sputtering is narrower in width (preferably having a width of less than 0.3 micrometers (μm)) than a structure that is formed using a conventional dry etch process (having a minimum width of about 0.4 μm). This structure made according to the invention can be used as a magnetic pole of a thin film head ("TFH") for a data storage device. In addition, the method of the invention eliminates the need for using electroplating techniques or for forming of an electroplating mask that requires high resolution photolithography.

Figure 2:
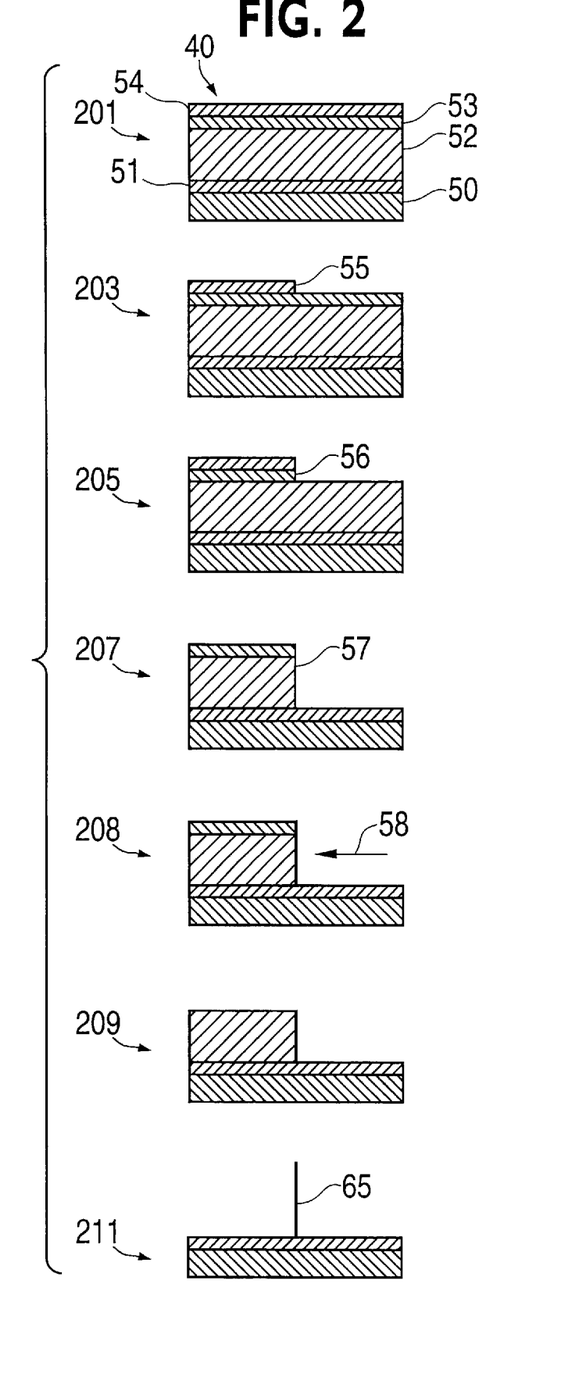
FIG. 2 is a schematic diagram of a process for fabricating sub-micrometer structures according to one embodiment of the present invention.

FIG. 2 shows a schematic diagram of the fabrication process according to one embodiment of the present invention, where a sputtering process is used to form a magnetic pole piece having a high aspect ratio (height/width) and a width of less than 0.3 μm, in accordance with certain embodiments of the invention. Prior to the creation of the magnetic pole piece, a multi-layer structure 40 is formed on a wafer or substrate 50. Substrate 50 may comprise AlTiC, silicon (Si), glass or any conventional substrate.

A seedlayer 51 is deposited on the top surface of substrate 50. Seedlayer 51 can comprise, for example, a magnetic material such as Permalloy (NiFe), that acts as a source for the magnetic pole piece during sputtering. Other conventional magnetic or non-magnetic metallic substances can also be utilized, such as NiFeCo, FeMn, NiMnSb, CoFeB, CoSm, and other metals and alloys. According to one embodiment of the invention, seedlayer 51 can have an initial thickness of greater than 1000 Angstroms.

A thick polymer layer 52 is deposited on the surface of the seedlayer 51. The polymer layer 52 can comprise a conventional photoresist, a polymeric substance, or other organic materials. The thickness of polymer layer 52 depends on the type of submicrometer structure to be formed. For example, when forming submicrometer structures with high aspect ratios, the thickness of layer 52 should be about 3 μm or greater. Preferably, layer 52 has an initial thickness of about 4 μm to about 6 μm.

A mask layer 53 is deposited on layer 52. Layer 53 can comprise an oxide layer, such as silicon oxide ($SiO_2$), or an Al, Tantalum (Ta), or other metal layer. Layer 53 acts as a hard mask for photoresist etching. A thin, photopolymer layer (or "image layer") 54, which can comprise a conventional photoresist, aphotopolymer or a photosensitive non-polymeric substance, is deposited on mask layer 53. The term "image layer" is used because patterning is initiated in layer 54, which is about 1.0 μm or less in thickness.

In step 201, the thin image layer 54 is lithographically patterned to create an initial vertical side surface 55. For example, a master mask (not shown) can be imaged with reduction on the thin image layer. The process of the present invention does not require high resolution lithography, because the final width of the magnetic pole does not depend on a lithography process.

Next, in step 203, a conventional wet development step (using a conventional developer) is utilized to produce a profile having a substantially horizontal top surface and substantially vertical side surface 55.

Next, in step 205, a mask etch is performed to remove the exposed portion 56 of mask layer 53 to expose a portion of polymer layer 52.

Polymer layer 52 is subjected to a conventional dry etch in step 207, where the remaining oxide layer 53 is used as a mask. In step 207, an ion beam, or anisotropic RIE (or ICP) technique can be utilized. For example, a RIE process can be performed with a plasma etching system to remove a portion of polymer layer 52 to expose a portion of seedlayer 51. The RIE process forms a straight, vertical sidewall that initially defines the surface that the seedlayer is subsequently sputtered onto. The RIE process may comprise oxygen-based RIE, or other appropriate processes, depending on the materials used for the polymer layer, mask layer, and seed layer.

Alternatively, an Inductively Coupled Plasma etching ("ICP") technique can be used to perform the etch of layer 52. An ICP process differs from an RIE process in that the mechanical and chemical portions of the ICP process can be separately controlled.

According to an embodiment of the present invention, a sputtering step 208 is utilized to deposit atoms originating from the exposed portion of the seedlayer 51 onto sidewall 57, wherein the deposition has a directional component along arrow 58. Step 208 may also be referred to as an overetch step. Sputtering step 208 can be accomplished by RIE, ICP, or any other ion beam technique.

For example, if using an RIE technique to etch the polymer layer 52, after layer 52 is etched, inert gas plasma can be used to perform a physical sputter of the exposed portion of seedlayer 51. Such gas can be Argon. Material from the exposed seedlayer is sputtered onto the adjacent polymer layer sidewall in a controllable manner. The parameters used to control the sputtering (and the resulting thickness of the pole piece) include, but are not limited to, the sputtering yield of the seedlayer material, the thickness of the seedlayer, and the overetch time. If a Permalloy (or other NIFe-based composition) seedlayer material is used, a NiFe magnetic pole structure is then formed along sidewall 57.

One advantage of the present invention is that the overetch may be performed by the same apparatus and in the same chamber as the dry etch is performed. For example, if an oxygen-based RIE technique is utilized for step 207, the oxygen flow can be turned off when the exposed portion layer 52 is removed, then Argon can be introduced into the plasma stream to perform the sputtering. Thus, both steps 207 and 208 can be performed in the same chamber.

After formation of the magnetic pole structure, in step 209, a mask etch is performed to remove the remaining portion of mask layer 53 to expose a portion of polymer layer 52. In step 211, the remaining polymer layer is stripped in a conventional manner. For example, oxygen-based RIE can be used to remove the remaining polymer layer 52.

The resulting pole piece 65 has a high aspect ratio, can have a height of about 5 μm or more and a width of less than 0.3 μm, if desired. According to an embodiment of the present invention, the fabrication process can be used to produce free-standing magnetic structures having widths of from about 0.01 μm or smaller to about 0.3 μm or larger (if desired).

Figure 3:
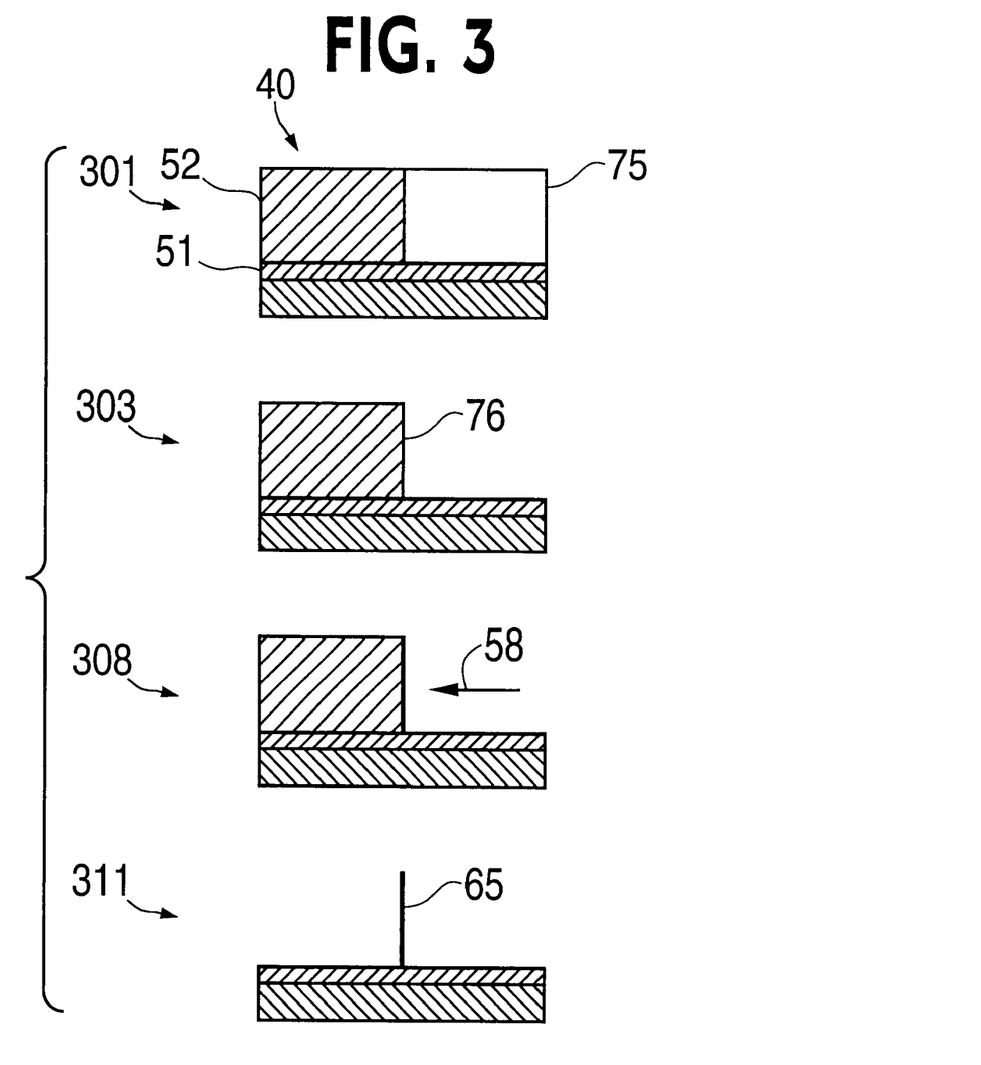
FIG. 3 is a schematic diagram of a process for fabricating sub-micrometer structures according to another embodiment of the present invention.

A second embodiment of the process of the present invention is shown in FIG. 3. A multi-layer structure 70 is formed on a wafer or substrate 50. Wafer 50 is coated with a seedlayer 51 and a thick polymer layer 52. Layer 52 can comprise a conventional photoresist or a photosensitive polymeric substance. The thickness of polymer layer 52 depends on the type of submicrometer structure to be formed. For example, when forming submicrometer structures with high aspect ratios, the thickness of layer 52 should be about 3 μm or greater. Preferably, layer 52 has an initial thickness of about 4 μm to about 6 μm. Other polymer layer thicknesses may be utilized as would be apparent to one of skill in the art given the present description. Unlike the embodiment shown in FIG. 2, multi-layer structure 70 does not include a mask layer or a thin image layer. Thus, in the embodiment shown in FIG. 3, polymer layer 52 acts as an image layer for the multi-layer structure.

In step 301, layer 52 is lithographically patterned with a resolution of about 0.4 μm under a conventional exposure process to expose a portion of seedlayer 51. According to the present invention, lower resolution photolithography can be used than is used in conjunction with conventional electroplating processes because a narrow trench, which is used in processes that require an electroplating step, is not required to be formed.

In step 303, a conventional wet development step (using a conventional developer) can be utilized to produce a profile having a substantially horizontal top surface and a vertical side surface 76 (at least for the major portion of its height).

In step 308, the multi-layer structure 70 is treated with an ion beam or anisotropic RIE (or ICP) technique to sputter atoms from the exposed portion seedlayer 51 onto sidewall 76, wherein the deposition has a directional component along arrow 58, for a predetermined period of time based on the desired width of the structure being formed. The excess polymer layer is stripped in step 311. The resulting pole piece 65 has a high aspect ratio and a width of less than 0.3 μm (depending upon design criteria), if desired, depending upon the extent of sputtering. Thus, an advantage of this embodiment of the present invention is that a thick photopolymer layer lithography can be used to form the vertical surface that the sputtered atoms are deposited onto, and this occurs without having to perform subsequent mask etch step.

Figure 4:
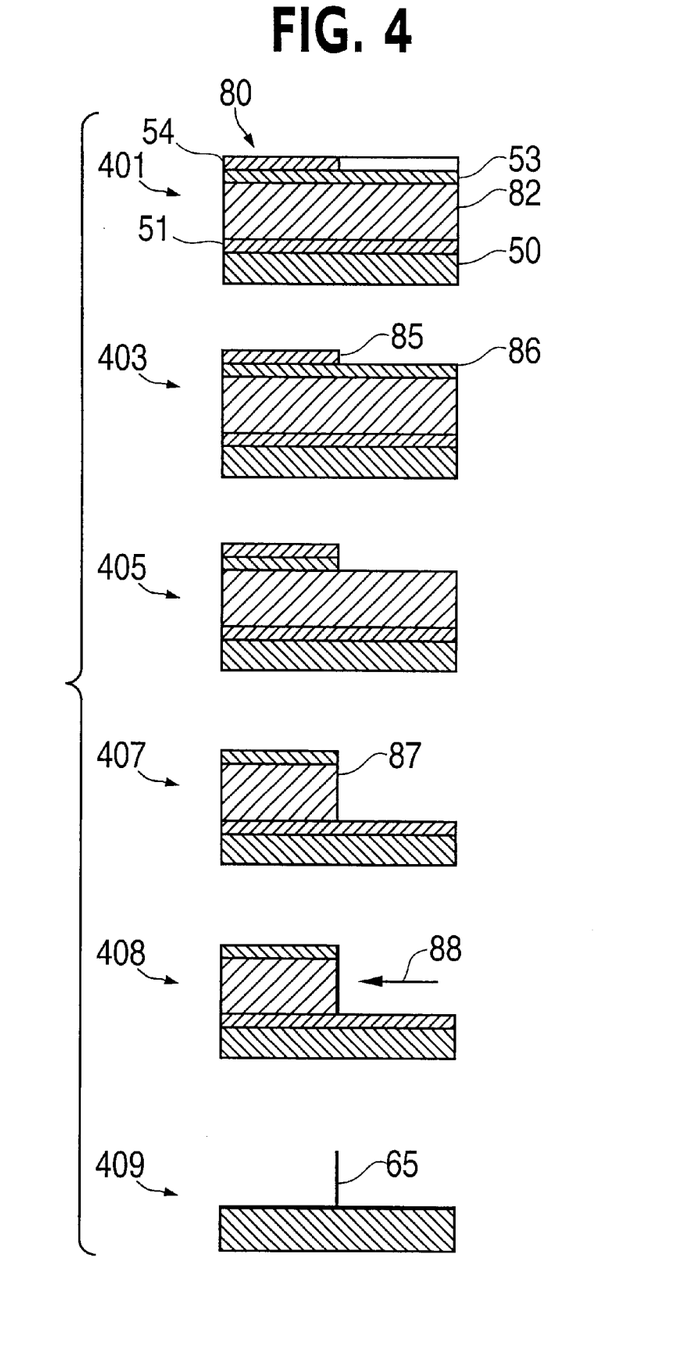
FIG. 4 is a schematic diagram of a process for fabricating sub-micrometer structures according to another embodiment of the present invention.

Another embodiment of the process of the present invention is shown in FIG. 4. A multi-layer structure 80 is formed on a wafer or substrate 50. Wafer 50 is coated with a seedlayer 51 and a layer 82 that comprises an etchable material. For example, instead of using a thick polymer layer, such as described above with respect to FIGS. 2 and 3, etchable material 82 may consist of $SiO_2$, SiON, and the like. According to the present invention, the physical composition of layer 52 is not critical, as long as the material can be etched by conventional etching techniques to form a vertical sidewall.

A mask layer 53 is deposited on layer 82. Layer 53 can comprise an $Al_2O_3$ (alumina) material or a metal, such as Al, Tantalum (Ta), Chromium (Cr), and the like. A thin, image layer 54, such as the type described above with respect to FIG. 2, is deposited on mask layer 53.

In step 401, the thin photopolymer (image) layer 54 is lithographically patterned to create an initial vertical side surface. For example, a master mask (not shown) can be imaged with reduction on the thin image layer. Next, in step 403, a conventional wet development step (using a conventional developer) is utilized to produce a profile having a substantially horizontal top surface and substantially vertical side surface 85.

Next, in step 405, a mask etch is performed to remove the exposed portion 86 of mask layer 53 to expose a portion of layer 82. For example, in this embodiment, the $Al_2O_3$ —mask etch may comprise an ICP process using chlorine-based gases. Alternatively, RIE and other techniques may also be utilized.

Layer 82 is subjected to a conventional dry etch in step 407, where the remaining oxide layer 53 is used as a mask. In step 407, an ion beam, or anisotropic RIE (or ICP) technique can be utilized. For example, an ICP process (e.g., fluorine-based) can be performed with a plasma etching system to remove a portion of layer 82 to expose a portion of seedlayer 51. The ICP process forms a straight, vertical sidewall that initially defines the surface that the seedlayer is subsequently sputtered onto. Alternatively, a RIE technique can be used to perform the etch of layer 82.

According to an embodiment of the present invention, a sputtering step 408 is utilized to deposit atoms originating from the exposed portion of the seedlayer 51 onto sidewall 87, wherein the deposition has a directional component along arrow 88. Sputtering step 408 can be accomplished by RIE, ICP, or any other ion beam technique.

After formation of the magnetic pole structure, in step 409, an etch is performed to remove the remaining portion of mask layer 53 and layer 82. The resulting pole piece 65 has a high aspect ratio and a width of less than 0.3 μm, if desired, depending upon the extent of sputtering.

Figure 5:
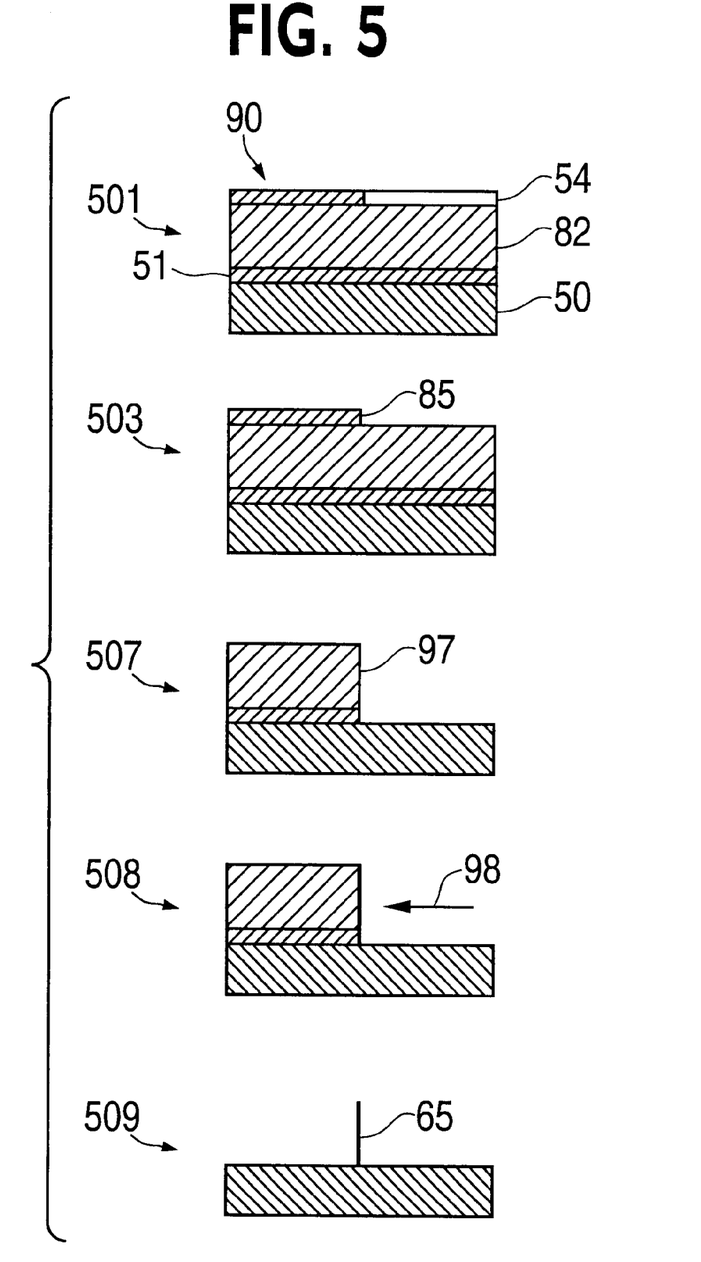
FIG. 5 is a schematic diagram of a process for fabricating sub-micrometer structures according to another embodiment of the present invention.

Another embodiment of the process of the present invention is shown in FIG. 5. A multi-layer structure 90 is formed on a wafer or substrate 50. Wafer 50 is coated with a seedlayer 51 and a layer 82 that comprises an etchable material, similar to the material described above with respect to FIG. 4. According to the present invention, the physical composition of layer 82 is not critical, as long as the material can be etched by conventional etching techniques to form a vertical sidewall.

An image layer 54, such as the type described above, is deposited on layer 82. According to this embodiment of the present invention, a mask layer, such as layer 53 from FIG. 4, is not utilized. In step 501, the image layer 54 is lithographically patterned to create an initial vertical side surface. For example, a master mask (not shown) can be imaged with reduction on the thin image layer. Next, in step 503, a conventional wet development step (using a conventional developer) is utilized to produce a profile having a substantially horizontal top surface and substantially vertical side surface 85.

Layer 82 can be subjected to a conventional dry etch in step 507, where an anisotropic RIE (or ICP) technique can be utilized. For example, an ICP process (e.g., fluorine-based) can be performed with a plasma etching system to remove a portion of layer 82 to expose a portion of seedlayer 51. The ICP process forms a straight, vertical sidewall that initially defines the surface that the seedlayer is subsequently sputtered onto. Alternatively, a RIE technique can be used to perform the etch of layer 82.

According to an embodiment of the present invention, a sputtering step 508 is utilized to deposit atoms originating from the exposed portion of the seedlayer 51 onto sidewall 97, wherein the deposition has a directional component along arrow 98. Sputtering step 508 can be accomplished by RIE, ICP, or any other ion beam technique.

After formation of the magnetic pole structure, in step 509, an etch is performed to remove the remaining portion of layer 82. The resulting pole piece 65 has a high aspect ratio and a width of less than 0.3 $\mu$m, if desired, depending upon the extent of sputtering.

Figure 6:
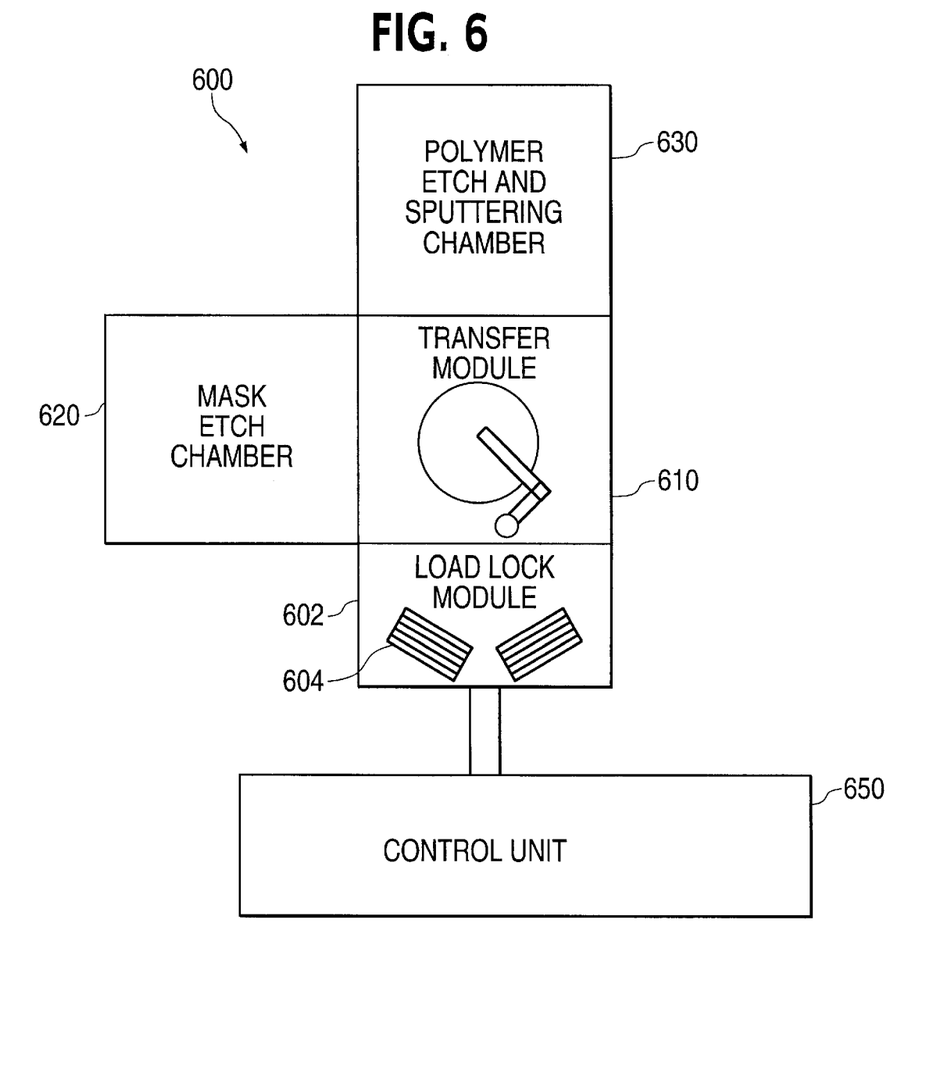
FIG. 6 is a schematic diagram of a device of the present invention to fabricate a magnetic pole structure.

According to another embodiment of the present invention, a device can be utilized to perform the mask etch, polymer layer etch, and sputtering steps to fabricate a magnetic pole structure. As shown in FIG. 6, an exemplary processing unit 600 is shown having a load lock module 602, a transfer module 610, a mask etch chamber 620, a polymer etch and sputtering chamber 630, and a control unit 650. For example, the process steps can be performed in a modified commercial unit, such as a Versalock® 700 model processing platform (available from Plasma-Therm Inc.), a semi-automated handling system and general purpose tool for use in a wide variety of semiconductor fabrication applications.

In one mode of operation, a robotic handling system 614 in transfer module 610 takes wafers 604 out of a storage cassette 610, which have been loaded from a lock load module 602. The robotic system then loads the wafers into the appropriate processing chamber. In this example, the wafers are pre-formed multi-layer structures, such as structure 40 in FIG. 2. A first vacuum chamber, such as mask etch chamber 620, can be used to perform a mask etch of a multilayer structure, such as a silicon oxide layer. The mask etch can be performed by a Reactive Ion Etching ("RIE") technique or an Inductively Coupled Plasma etching ("ICP") technique.

After the mask etch process, the robotic system then loads the multilayer structures into the polymer etch and sputtering chamber 630. This vacuum chamber can utilize an ICP or RIE technique to etch a thick polymer layer of a multi-layer structure to create a vertical surface which a magnetic pole material is sputtered onto. The sputtering time can be preset or controlled through control unit 650, which includes a graphical user interface to allow an operator to control all aspects of the processing. Alternatively, the mask etch and the polymer etch could be performed in a single chamber, but with additional cleaning process between the mask etch and polymer etch.

The device and process of the present invention have several applications. First, the invention can be utilized as a microfabrication technique for submicrometer structures. In particular, the invention can be utilized to fabricate magnetic pole tips for read/write heads of data storage devices. The process of the present invention also can be adapted to the formation of micro-electro-mechanical systems ("MEMS") with high aspect ratio structures.

A sample magnetic pole structure was fabricated according to the present invention. The sample multi-layer structure, similar to multi-layer structure 40 shown in FIG. 2, included an AlTiC substrate, a Permalloy (NiFe) layer of a thickness of about 1000 Angstroms and a thick polymer layer (comprising a conventional photoresist) having a thickness of about 4.5 $\mu$m. The sample multi-layer structure was then processed according to the methods described in detail above. I-line lithography and regular wet development were used for photoresist image layer patterning. Then, fluorine gas plasma in an RIE chamber was used for the SiO$_2$ mask etch. Then, the thick polymer layer was etched in an ICP chamber using oxygen-based plasma. An overetch process (ie., NiFe seed layer sputtering) was performed in the same ICP chamber using Ar plasma. Then, fluorine plasma was used for the remaining SiO$_2$ mask stripping, and finally oxygen-based plasma was used for photoresist stripping.

Figure 7:
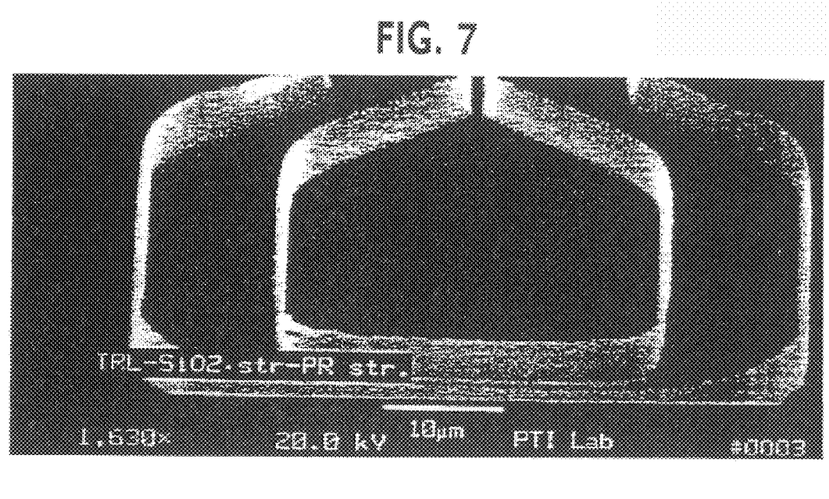
FIG. 7 is a scanning electron microscope ("SEM") image of the results of a free-standing submicrometer structure formed by a process according to the present invention.
Figure 8:
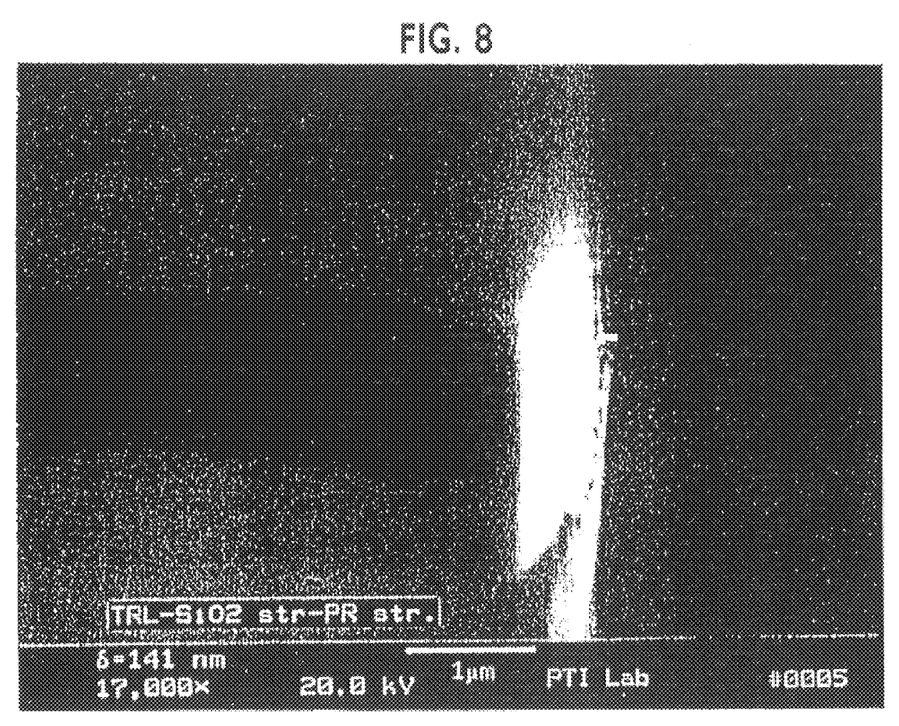
FIG. 8 is a SEM image (close-up view of FIG. 7) of a portion of a free-standing submicrometer structure formed by a process according to the present invention.
Figure 9:
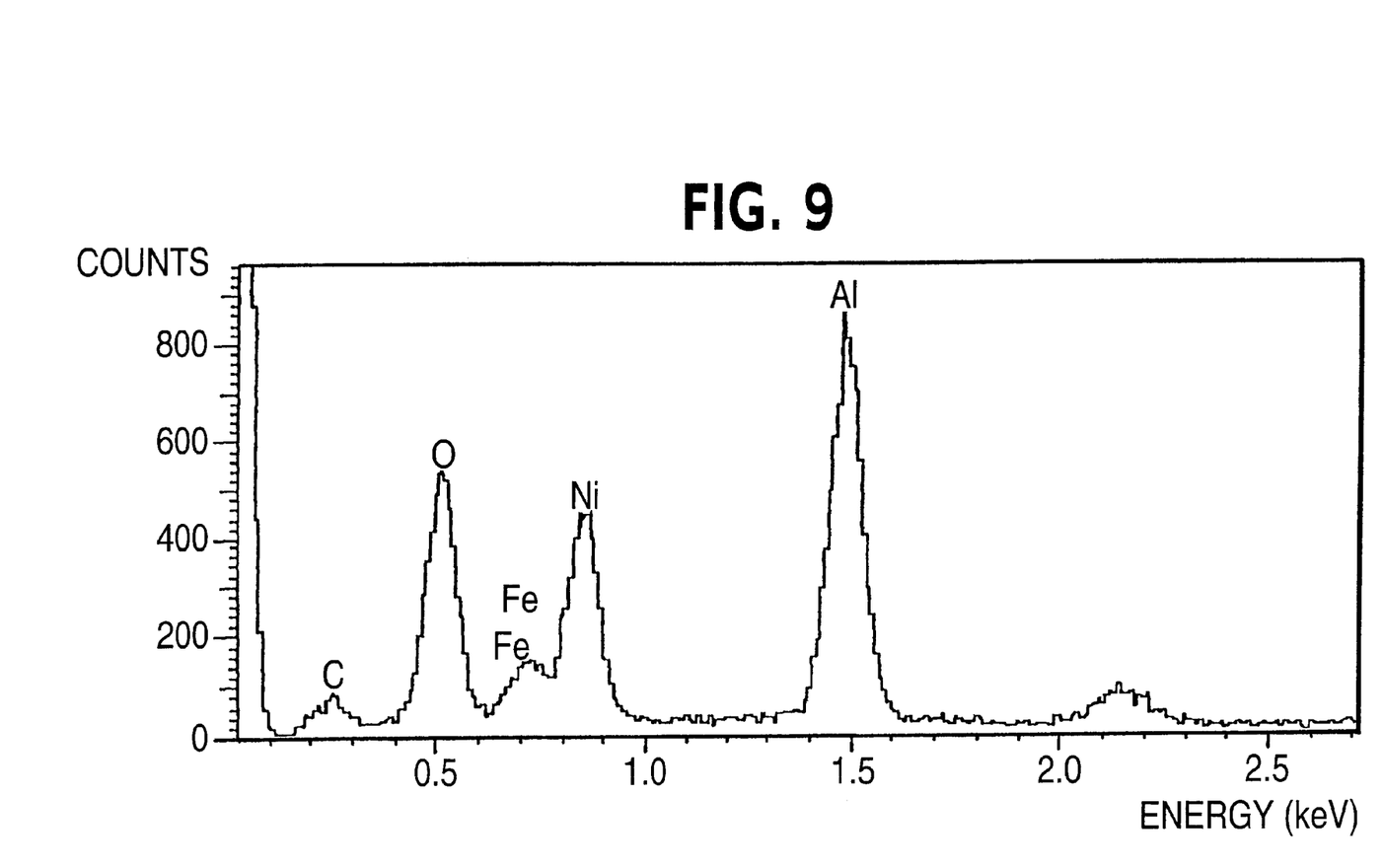
FIG. 9 is an x-ray analysis of the composition of the magnetic seedlayer after sputtering according to a process of the present invention.
Figure 10:
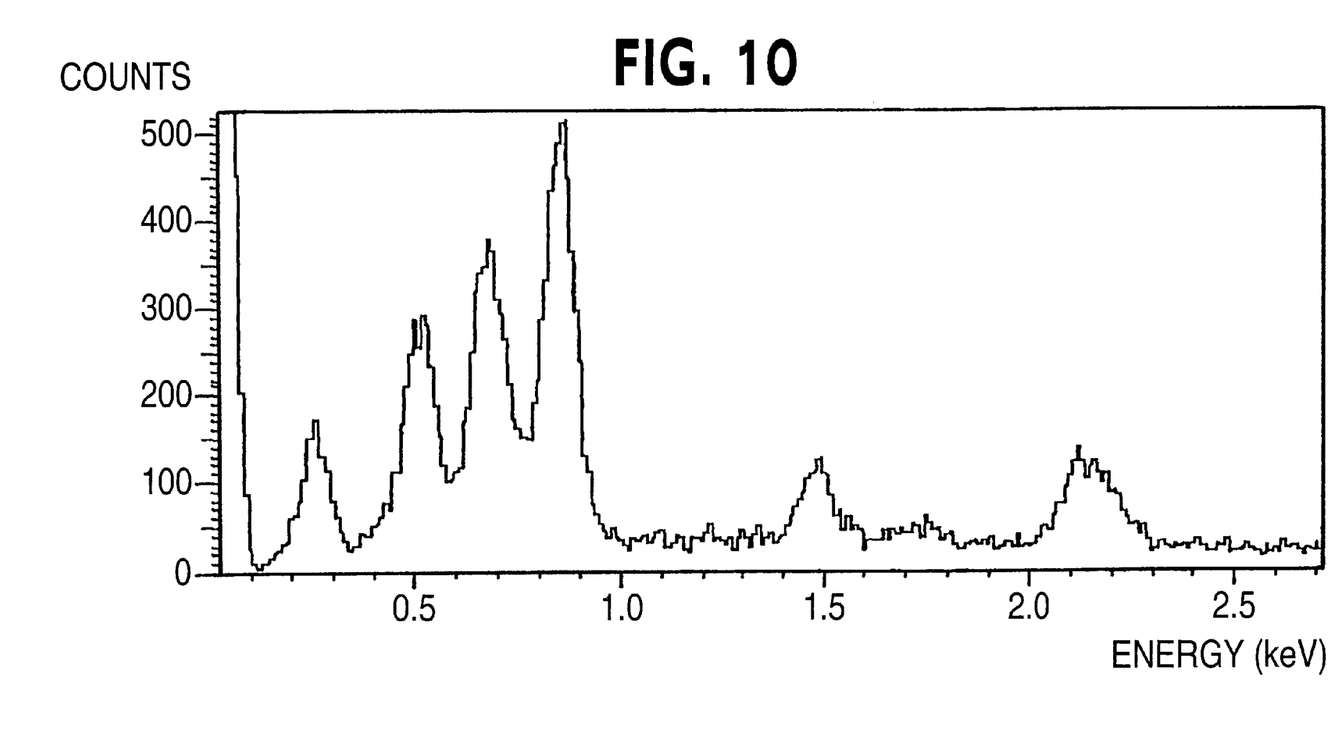
FIG. 10 is an x-ray analysis of the composition of a sputtered sidewall formed according to a process of the present invention.
Figure 11:
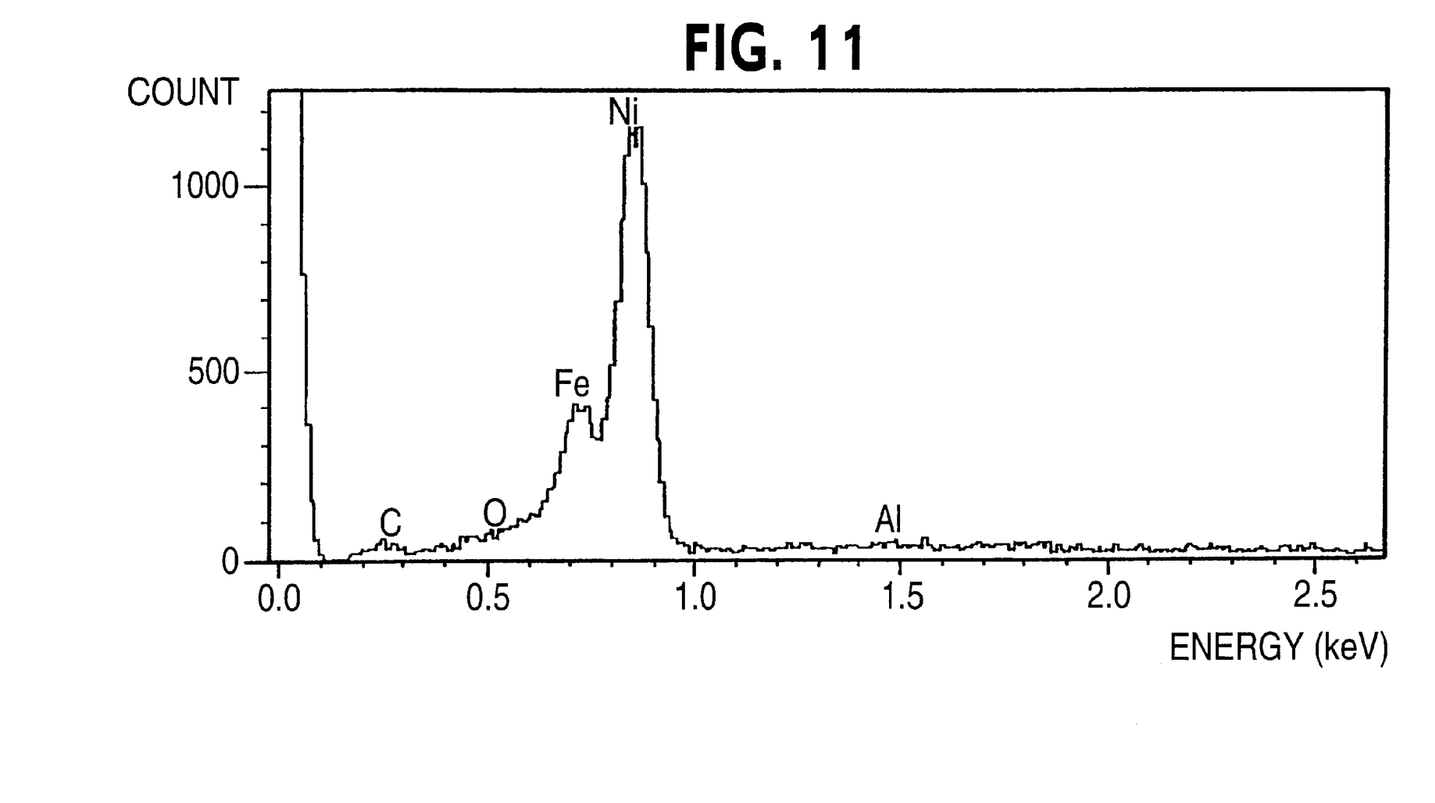
FIG. 11 is an x-ray analysis of the composition of NiFe bulk material.

The results of the test sample fabrication are shown in FIGS. 7–8, which are scanning electron microscope (SEM) images of the free standing submicrometer walls sputtered during the fabrication process. FIG. 7 shows the entire structure on a 10 $\mu$m scale. FIG. 8 shows a detailed views of one portion of the free-standing structure, which has a measured width of about 0.140 $\mu$m. FIGS. 9–11 show the results of an x-ray analysis performed on the test sample structure formed. In these figures, the composition of the magnetic structure (FIG. 10) and the composition of the seedlayer after sputtering (FIG. 9) can be compared to a Permalloy bulk material (FIG. 11). Thus, magnetic pole tips having widths of less than 0.3 microns may be formed according to embodiments of the present invention.

While the invention has been described in detail and with reference to specific embodiments thereof, it will be apparent to one skilled in the art that various changes and modifications can be made therein without departing from the spirit and scope of the invention. Thus, the breadth and scope of the present invention should not be limited by any of the above-described exemplary embodiments.

What is claimed is:

1. A method for forming a submicrometer structure from a multi-layer mask structure, the multi-layer mask structure including a substrate, a seedlayer deposited on said substrate, a first polymer layer deposited on said seedlayer, a mask layer deposited on said first polymer layer, and a second polymer layer deposited on said mask layer, said first polymer layer being thicker than said second polymer layer and said second polymer layer being a photosensitive polymer, comprising:

performing a first etch of said first polymer layer to define a vertical sidewall portion of said first polymer layer; and sputtering atoms from said seedlayer onto said vertical sidewall portion of said first polymer layer to form the submicrometer structure, wherein said seedlayer comprises a magnetic material.

2. The method according to claim 1, wherein said first etch comprises a reactive ion etching process.

3. The method according to claim 1, wherein said first etch comprises an inductively coupled plasma etching process.

4. The method according to claim 1, further comprising:

prior to said first etch, lithographically patterning said second polymer layer with an exposure;

developing the second polymer layer; and performing a second etch on said mask layer.

5. A method for forming a submicrometer structure from a multi-layer mask structure, the multi-layer mask structure including a substrate, a seedlayer deposited on said substrate, and a polymer layer deposited on said seedlayer, said polymer layer being a photosensitive polymer, comprising:

lithographically patterning said polymer layer with an exposure to define a vertical sidewall portion of said polymer layer; and 'sputtering atoms from said seedlayer onto said vertical sidewall portion of said polymer layer to form the submicrometer structure, wherein said seedlayer comprises a magnetic material.

6. The method according to claim 5, wherein said structure formed is a magnetic pole.

7. A method of fabricating a submicrometer structure from a multi-layer mask structure that includes a substrate, a seedlayer deposited on said substrate, and a polymer layer deposited on said seedlayer, said polymer layer being a photosensitive polymer and having a thickness of about 4 micrometers to about 6 micrometers, comprising:

lithographically patterning said polymer layer with an exposure to define a vertical sidewall portion of said polymer layer;

sputtering atoms from said seedlayer onto said vertical sidewall portion of said polymer layer to form a submicrometer structure that is coupled to said seedlayer, wherein said seedlayer comprises a magnetic material.

8. The method according to claim 7, wherein said formed structure has a width of less than 0.3 micrometers.

9. The method according to claim 7, further comprising:

removing excess polymer from said multi-layer mask structure mask after said sputtering.

10. The method according to claim 7, wherein said structure formed is a magnetic pole.

11. A method for forming a submicrometer structure from a multi-layer mask structure, the multi-layer mask structure including a substrate, a seedlayer deposited on said substrate, a first polymer layer deposited on said seedlayer, a mask layer deposited on said first polymer layer, and a second polymer layer deposited on said mask layer, said first polymer layer having a thickness of about 4 micrometers to about 6 micrometers and being thicker than said second polymer layer, said second polymer layer being a photosensitive polymer, comprising:

lithographically patterning said second polymer layer with an exposure;

developing the second polymer layer;

performing a second etch on said mask layer;

performing a polymer etch of said first polymer layer to define a vertical sidewall portion of said first polymer layer; and sputtering atoms from said seedlayer onto said vertical sidewall portion of said first polymer layer to form the submicrometer structure, wherein said seedlayer comprises a magnetic material.

12. The method according to claim 11, wherein said formed structure has a width of less than 0.3 micrometers.

13. The method according to claim 11, further comprising:

removing excess polymer from said first polymer layer after said sputtering to leave a free-standing submicrometer structure.

14. The method according to claim 11, wherein said structure formed is a magnetic pole.

* * * * *